United States Patent
Chen

(10) Patent No.: US 12,380,544 B2
(45) Date of Patent: Aug. 5, 2025

(54) LANE DETECTION METHOD INTEGRATEDLY USING IMAGE ENHANCEMENT AND DEEP CONVOLUTIONAL NEURAL NETWORK

(71) Applicant: ZHEJIANG GONGSHANG UNIVERSITY, Zhejiang (CN)

(72) Inventor: Weigang Chen, Hangzhou (CN)

(73) Assignee: ZHEJIANG GONGSHANG UNIVERSITY, Hangzhou (CN)

( * ) Notice: Subject to any disclaimer, the term of this patent is extended or adjusted under 35 U.S.C. 154(b) by 434 days.

(21) Appl. No.: 18/107,514

(22) Filed: Feb. 9, 2023

(65) Prior Publication Data

US 2023/0186439 A1 Jun. 15, 2023

Related U.S. Application Data

(63) Continuation of application No. PCT/CN2022/078677, filed on Mar. 1, 2022.

(30) Foreign Application Priority Data

Jun. 28, 2021 (CN) .......................... 202110717975.6

(51) Int. Cl.
*G06T 5/90* (2024.01)
*G06T 5/40* (2006.01)
(Continued)

(52) U.S. Cl.
CPC ................ *G06T 5/90* (2024.01); *G06T 5/40* (2013.01); *G06T 2207/10024* (2013.01); *G06T 2207/20084* (2013.01); *G06T 2207/30256* (2013.01)

(58) Field of Classification Search
CPC ... G06T 5/90; G06T 5/40; G06T 2207/10024; G06T 2207/20084; G06T 2207/30256;
(Continued)

(56) References Cited

U.S. PATENT DOCUMENTS

2021/0024090 A1 1/2021 Maat

FOREIGN PATENT DOCUMENTS

| AU | 2020103901 A4 | 2/2021 |
| CN | 106887004 A | 6/2017 |

(Continued)

OTHER PUBLICATIONS

International Search Report (PCT/CN2022/078677); Date of Mailing: May 18, 2022.

(Continued)

*Primary Examiner* — Amandeep Saini
*Assistant Examiner* — Andrew S Budisalich
(74) *Attorney, Agent, or Firm* — Wiersch Law Group

(57) ABSTRACT

A lane detection method integratedly using image enhancement and a deep convolutional neural network. On the assumption that lanes have similar widths in a local region of an image and a lane can be segmented into several image blocks, each of which contains lane marking in the center, a method based on a deep convolutional neural network is provided to detect lane marking blocks in the image. Input to the model includes road images captured by a camera as well as a set of enhanced images generated by the contrast limited adaptive histogram equalization (CLAHE) algorithm. The method according to the present disclosure can effectively overcome difficulties of lane detection under complex imaging conditions, such as poor image quality, and small lane marking targets, so as to achieve better robustness.

3 Claims, 4 Drawing Sheets

(51) Int. Cl.
  *G06V 10/44* (2022.01)
  *G06V 10/75* (2022.01)
  *G06V 20/56* (2022.01)

(58) Field of Classification Search
  CPC .................. G06T 7/0002; G06T 7/90; G06T 2207/20061; G06T 2207/20081; G06V 10/20; G06V 10/454; G06V 10/753; G06V 10/82; G06V 20/588; G06N 3/045; G06N 3/08
  See application file for complete search history.

(56) References Cited

FOREIGN PATENT DOCUMENTS

| CN | 108960183 | A | * | 12/2018 | ........... G01S 13/931 |
| CN | 110826588 | A | * | 2/2020 | |
| CN | 111242037 | A | | 6/2020 | |
| CN | 111275199 | A | * | 6/2020 | ............. G06N 20/00 |
| CN | 111582201 | A | | 8/2020 | |
| CN | 112036231 | A | | 12/2020 | |
| CN | 112446353 | A | | 3/2021 | |
| CN | 112686097 | A | * | 4/2021 | |
| CN | 113298810 | A | | 8/2021 | |
| CN | 111860287 | B | * | 12/2024 | ......... G06F 18/2415 |
| WO | 2020101448 | A1 | | 5/2020 | |
| WO | WO-2022193132 | A1 | * | 9/2022 | |

OTHER PUBLICATIONS

Research-on-lane-detection-based-on-deep-learning.
Road-Traffic-Marking-Detection-and-Recognition-Based-on-Multi-level-Fusion-and-Convolutional-Neural-Networks.
Notice Of Allowance(CN202110717975.6); Date of Mailing: Dec. 1, 2023.
Optimization-of-Underwater-Photoelectric-Image-Quality-Basedon-Deep-Convolutional-Neural-Networks.

* cited by examiner

LANE DETECTION METHOD INTEGRATEDLY USING IMAGE ENHANCEMENT AND DEEP CONVOLUTIONAL NEURAL NETWORK

CROSS-REFERENCE TO RELATED APPLICATIONS

The present application is a continuation of International Application No. PCT/CN2022/078677, filed on Mar. 1, 2022, which claims priority to Chinese Application No. 202110717975.6, filed on Jun. 28, 2021, the contents of both of which are incorporated herein by reference in their entireties.

TECHNICAL FIELD

The present disclosure relates to the field of computer vision, and in particular, to a lane detection method integratedly using image enhancement and a deep convolutional neural network.

BACKGROUND

Bad weather, such as rain, fog, and sand, and complicated imaging conditions, such as backlight, glare, and low illumination, may affect the camera sensor of an advanced driver assistance system (ADAS) or an automatic driving system, and greatly degrade the quality of the captured images. With both conventional edge-detection based methods and deep-learning based methods, the quality of input images may greatly affect the performance of the detection system. In order to cope with the difficulties of lane detection under complex imaging conditions, in embodiments of the present disclosure, on the assumption that lanes are solid or dashed lines of locally constant width, and a marker line can be segmented into several image blocks, each of which contains of lane marking in the center, a method based on a deep convolutional neural network is provided to detect marking blocks in the image. Input to the model includes road images captured by a camera as well as a set of enhanced images generated by the CLAHE (contrast limited adaptive histogram equalization) algorithm.

SUMMARY

An objective of the present disclosure is to provide a lane detection method integratedly using image enhancement and a deep convolutional neural network, so as to solve the difficulties of the prior art under complicated imaging conditions.

The present disclosure specifically adopts the following technical solution: a lane detection method integratedly using image enhancement and a deep convolutional neural network, and the method includes:

Step (1), acquiring a color image I contains lanes, including three component images $I^{(0)}$, $I^{(1)}$, and $I^{(2)}$ corresponding to red, green, and blue color components of I, respectively; performing the CLAHE algorithm to enhance the contrast of I and generate K enhanced images, where the kth enhanced image, k=0, 1, . . . , K−1, is formed by using the cth channel image $I^{(c)}$ as the input, where c is the remainder of k divided by 3.

Step (2), constructing the deep convolutional neural network, which consists of an input module, a spatial attention module, a feature extraction module, and a detection module, for lane detection, and stacking the three component images of the color image as well as the K enhanced images generated by the CLAHE algorithm in step (1) as a tensor including K+3 channels to serve as the input to the deep convolutional neural network.

Step (3), passing the input data through a convolutional layer containing 64 7×7 kernels with stride 2, performing a batch normalization and a ReLU activation operation, using a max pooling layer with a 3×3 sampling kernel and with a stride of 2 as the final part of the input module, and feeding the output of the input module, which is an $M_1 \times N_1 \times C$ feature map, to the spatial attention module, where $M_1$, $N_1$ and C denote the height, width and the number of channels of the feature map.

Step (4), performing, by the spatial attention module, two pooling operations on the feature map that input to the module. One is an average pooling and the other is a max pooling; in these two pooling operations, the size of the sampling kernel is 1×1×C, and the stride is 1, two $M_1 \times N_1 \times 1$ feature maps are formed by the pooling operations and concatenated as an $M_1 \times N_1 \times 2$ feature map, and then is fed to a convolutional layer with a 7×7 kernel and with a stride of 1, finally, a spatial attention map of size $M_1 \times N_1 \times 1$ is calculated using a Sigmoid function.

Step (5), taking elements in the spatial attention map as weights, multiplying values of all positions of each channel of the output feature map of the input module by weights of corresponding positions of the spatial attention map to form a feature map, and feeding it to the feature extraction module.

Step (6), taking Stage 2, Stage 3, and Stage 4 convolutional layer groups of ResNet50 network as the feature extraction module, where the output of Stage 3 serves as the input to Stage 4 as well as the input to a convolutional layer consists of $5n_B$ kernels of size 1×1 and with a stride of 1, where $n_B$ denotes a preset number of detection boxes for each anchor point, and the convolutional layer finally outputs a feature map denoted by $F_1$; the output of Stage 4 of ResNet50 passes through a convolutional layer consists of 5 $n_B$ kernels of size 1×1 and with a stride of 1, and the generated feature map is up-sampled and then sums corresponding elements one by one with $F_1$ to generate a $M_2 \times N_2 \times 5 n_B$ feature map F; the height and width of the feature map F are $M_2$ and $N_2$, respectively, and the number of channels is $5n_B$.

Step (7), in the feature map that obtained in step (6), each point on a $M_2 \times N_2$ plane corresponds to an anchor point; for an anchor point (m, n), the detection module evaluates values on all 5 $n_B$ channels to determine whether a lane marking block exists at the anchor point, and the size and shape of the marking block, the method is: let i be an integer and $1 \leq i \leq n_B$, a value of the ith channel represents the probability that the lane marking block is detected by using the ith preset detection box; from the $(n_B+1)$th to the $5n_B$th channels, each four channels corresponds to a set of position parameters of a detected marking block, where values of channels $n_B+4$ (i−1)+1 and $n_B+4$ (i−1)+2 represent offset values in the width and the height direction between the center of the ith preset detection box and the center of an actual detected marking block, respectively, a value of channel $n_B+4$ (i−1)+3 represents the ratio of the width of the preset detection box to that of the actual detected block, and the value of channel $n_B+4i$ represents the ratio of the height of the preset detection box to that of the detected block.

Step (8), determining the lane model by the Hough transform algorithm using center coordinates of the marking blocks detected by the deep convolutional neural network.

Further, in step (1), a specific process of performing the CLAHE algorithm to enhance the contrast of the image involves: first, processing image $I^{(c)}$ by using a sliding window, where the height and width of the window are $M_b+k\Delta$ and $N_b+k\Delta$, respectively, $M_b$, $N_b$, and $\Delta$ are preset constants that are set according to the size of the image and the expected number of the sliding windows, second, calculating the histogram of the block image covered by the sliding window as H, clipping a histogram bin $H_i$ as $H_i=h$ if $H_i$ exceeds a specified limit h, accumulating amplitude differences, distributing these accumulated differences uniformly to all bins of H, next, taking the modified histogram as input and calculating the mapping function for each gray level by the histogram equalization algorithm, and further, setting the sliding steps in height and width directions to half of the height and width of the sliding window, and taking the mean value of the mapping functions calculated by all the sliding windows covering a pixel in $I^{(c)}$ as the value of the pixel in the enhanced image.

Further, in step (2), parameters of the input module, the spatial attention module, the feature extraction module, and the detection module of the deep convolutional neural network are determined by learning, and the method includes the following sub-steps:

Sub-step A, manually labeling lane markings in the images, and segmenting a labeled lane into image blocks, where each image block contains a lane marking in the center and also overlaps some background regions in both left and right sides.

Sub-step B, preparing expected output for training images: if the height and width of the training image are M and N, respectively, the expected output corresponding to the image is an M'×N'×C' feature map, where $$M' = \left\lceil \frac{M}{8} \right\rceil, N' = \left\lceil \frac{N}{8} \right\rceil,$$

$\lceil a \rceil$ represents an integer no greater than a, $C'=5 n_B$ is the number of channels of the feature, and $n_B$ denotes a preset number of detection boxes for each anchor point, and all values of the expected feature map are set according to the coverage of labeled marking regions.

Sub-step C, training: inputting a training image to the deep convolutional neural network to generate a corresponding output feature map by the detection module, calculating a loss function according to the output feature map and the expected feature map corresponding to the training image, loading training images in batches to minimize the sum of loss functions of all training samples in batches, and updating network parameters by a stochastic gradient descent optimization algorithm.

The present disclosure has the following beneficial effects. The method according to the present disclosure can effectively overcome difficulties of lane detection in challenging scenarios, such as poor image quality and small lane marking targets, so as to achieve better robustness.

DESCRIPTION OF EMBODIMENTS

Specific embodiments of the present disclosure are described in further detail below with reference to the drawings.

The present disclosure is further elaborated below in conjunction with the drawings and specific embodiments to enable those skilled in the art to better understand the essence of the present disclosure.

Figure 1:
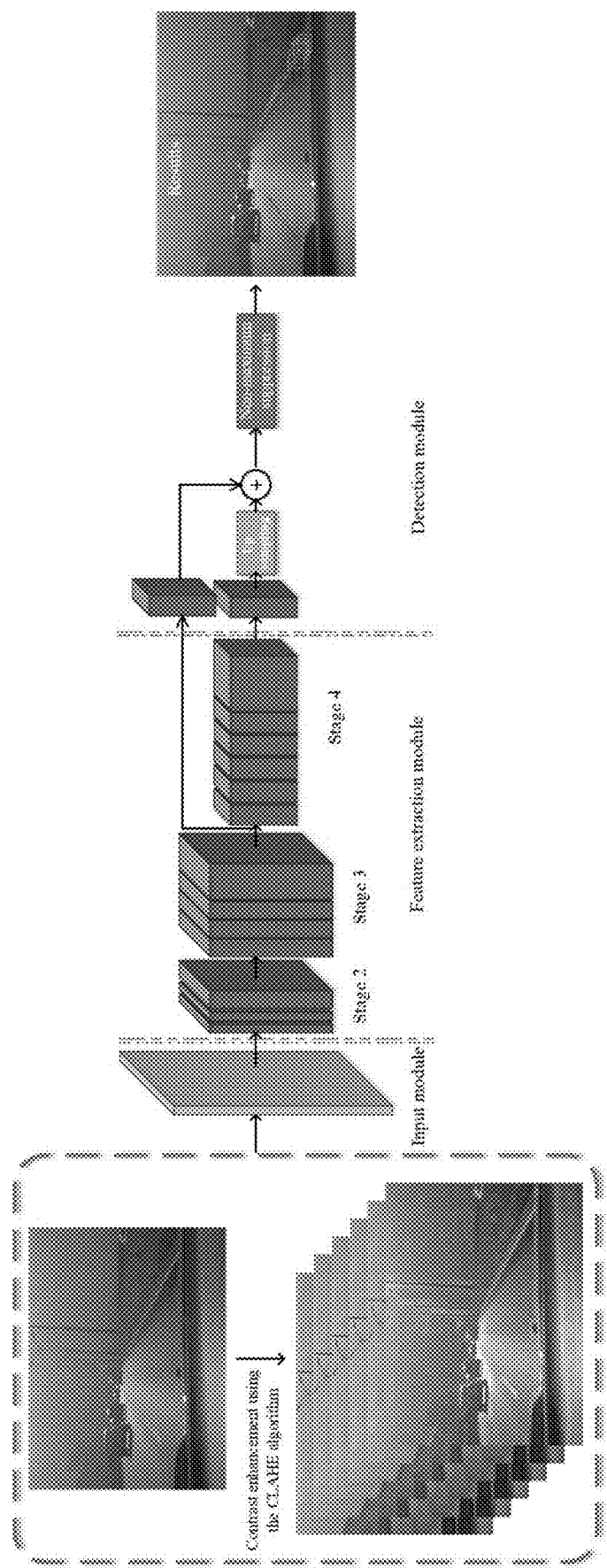
FIG. 1 is a schematic diagram of the lane detection method integratedly using image enhancement and a deep convolutional neural network according to the present disclosure.

As shown in FIG. 1, the present disclosure provides a lane detection method integratedly using image enhancement and a deep convolutional neural network, including the following specific steps.

Step (1), I is set as a to-be-processed color image, including three component images $I^{(0)}$, $I^{(1)}$, and $I^{(2)}$, corresponding to red, green, and blue, respectively, and the CLAHE is performed K times on I to enhance the contrast of an input image and generate K enhanced images, where the kth enhanced image, k=0, 1, . . . , K−1, is formed by using the cth channel image $I^{(c)}$ as the input. In one embodiment of the present disclosure, K=6, and c is equal to the remainder of k divided by 3. Steps of the algorithm are as follows. First, an image/(c) is processed by using a sliding window. The height and the width of the sliding window are $M_b+k\Delta$ and $N_b+k\Delta$, respectively, where $M_b$, $N_b$, and $\Delta$ are preset constants, which may be $M_b=18$, $N_b=24$, and $\Delta=4$. Second, the histogram of a block image covered by the sliding window is calculated and denoted as H; and if any histogram bin $H_i$ exceeds a specified limit h, it is clipped as $H_i=h$, and amplitude differences are accumulated according to the following formula:

$$T=\Sigma_i H_i-h \text{ when } H_i>h \tag{1}$$

Then, T/L is added back to all elements of the histogram H to form a modified histogram $\tilde{H}$, where L is the number of gray levels in the histogram. Next, taking $\tilde{H}$ as input, mapping functions for gray levels are calculated by using the histogram equalization algorithm. Further, in one embodiment of the present disclosure, sliding steps in height and width directions are set to half of the height and the width of the sliding window. A pixel (x, y) in $I^{(c)}$ may be covered by n sliding windows, where n=1,2 or 4, So, the mean value of mapping functions calculated by all the sliding windows covering (x, y) is taken as the value of the pixel in the enhanced image.

Figure 2:
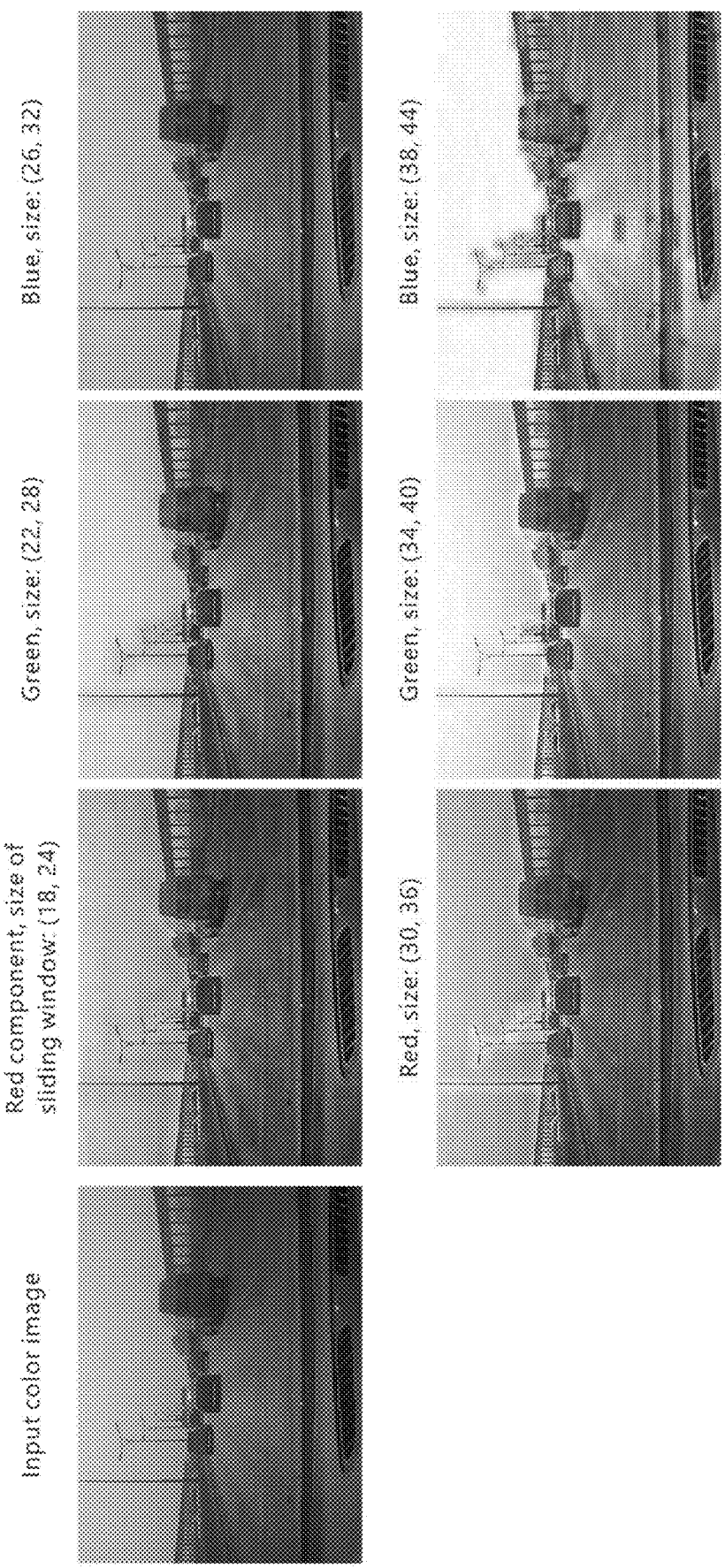
FIG. 2 shows an example of image enhancement results of the contrast limited adaptive histogram equalization algorithm.

Referring to FIG. 2, FIG. 2 shows from left to right an image captured in a backlight environment and six enhanced images generated according to the above steps. It is not difficult to see that better contrast exists between lane regions and background regions of the enhanced images.

Step (2), the three component images of the to-be-processed color image and the K enhanced images generated by using the CLAHE algorithm in the above step are stacked as a tensor including K+3 channels to serve as the input to the deep convolutional neural network in the embodiment of the present disclosure.

Step (3), the deep convolutional neural network for lane detection includes an input module, a spatial attention module, a feature extraction module, and a detection module. According to the data flow of the input module during forward propagation, input data first passes through a convolutional layer with 64 7×7 kernels and a stride of 2, and then a batch normalization operation and a ReLU activation operation are performed. The final part of the input module is a max pooling layer with a 3×3 sampling kernel and with a stride of 2.

Step (4), output x of the input module is an $M_1 \times N_1 \times C$ feature map, where $M_1$ and $N_1$ denote the height and the width, respectively, and C denotes the number of channels of the feature map. The spatial attention module performs two pooling operations on the input. One is mean-pooling operation and the other one is max-pooling operation. In the two pooling operations, the size of the sampling kernel is 1×1×C and the stride is 1. Two $M_1 \times N_1 \times 1$ feature maps are formed by the pooling operations and concatenated as an $M_1 \times N_1 \times 2$ feature map, and then the concatenated feature is fed to a convolutional layer with a kernel of 7×7 and with a stride of 1, and finally, a spatial attention map of a size of $M_1 \times N_1 \times 1$ is calculated using a Sigmoid function.

Step (5), elements in the spatial attention map are taken as weights. Values of all positions of each channel of the output feature map x of the input module are multiplied by weights of corresponding positions of the spatial attention map to form a feature map, and then is fed to the feature extraction module in the embodiment of the present disclosure.

Step (6), Stage 2, Stage 3, and Stage 4 convolutional layer groups of ResNet50 are taken as the feature extraction module, and the output of Stage 3 serves as the input to Stage 4 as well as the input to a convolutional layer consists of 5 $n_B$ kernels of size 1×1 and with a stride of 1, where ng denotes a preset number of detection boxes for each anchor point, and the convolutional layer finally outputs a feature map denoted by $F_1$. Output of Stage 4 passes through a convolutional layer consists of 5n kernels of size 1×1 and with a stride of 1, and the generated feature map is up-sampled and then sums corresponding elements one by one with $F_1$ to generate an $M_2 \times N_2 \times 5$ $n_B$ feature map F.

Step (7), the height and the width of the feature map F are $M_2$ and $N_2$, respectively, and the number of channels is $5n_B$. Each point on an $M_2 \times N_2$ plane in the feature map corresponds to an anchor point. The detection module judges, according to values of an anchor point (m, n) on all the channels, whether a lane marking block exists at the anchor point, and the size and the shape of the marking block. Let i denote an integer, where $1 \leq i \leq n_B$. A value of the ith channel represents a probability that the lane marking block is detected at an anchor point by using the ith preset detection box. From the $(n_B+1)$th to the $5n_B$th channels, each four channels correspond to a set of position parameters of a lane marking block detected by a given detection box. Specifically, values of channels $n_B+4$ (i−1)+1 and $n_B+4$ (i−1)+2 represent offset values in the width and the height direction between the center of the ith preset detection box and a center of the actual detection box, respectively, a value of a channel $n_B+4$ (i−1)+3 represents a ratio of a width of the preset detection box to a width of the actual detection box, and a value of a channel $n_B+4i$ represents a ratio of a height of the preset detection box to a height of the actual detection box.

Step (8), output of the detection module is a set of detected marking blocks, and a lane model is determined by the Hough transform algorithm using center coordinates of all the blocks in the set as inputs. Specifically, the center coordinates of a detected marking block is (u, v), and a lane is written as a straight line expressed in the polar coordinate system:

$$\rho = u \cos \theta + v \sin \theta \quad (2),$$

where ρ denotes the distance from the origin to the line in the Cartesian coordinate system, and θ denotes the angle between the x-axis and the vector that represented by p. For a given point (u, v), θ is set as an independent variable, and successively takes values in a range of 0°≤θ<180° using a preset step. Thus, a sequence of ρ values are calculated by substituting these θ values into above formula, and form a curve on the ρ-θ plane. The center of each detected marking block corresponds to a curve on the ρ-θ plane. Further, curves corresponding to the points that belong to a particular lane in the image space will intersect at a single point in the ρ-θ plane. If a point (ρ', θ') accumulates a large number of curves, a straight line of the image plane can be determined according to formula (2).

Figure 3:
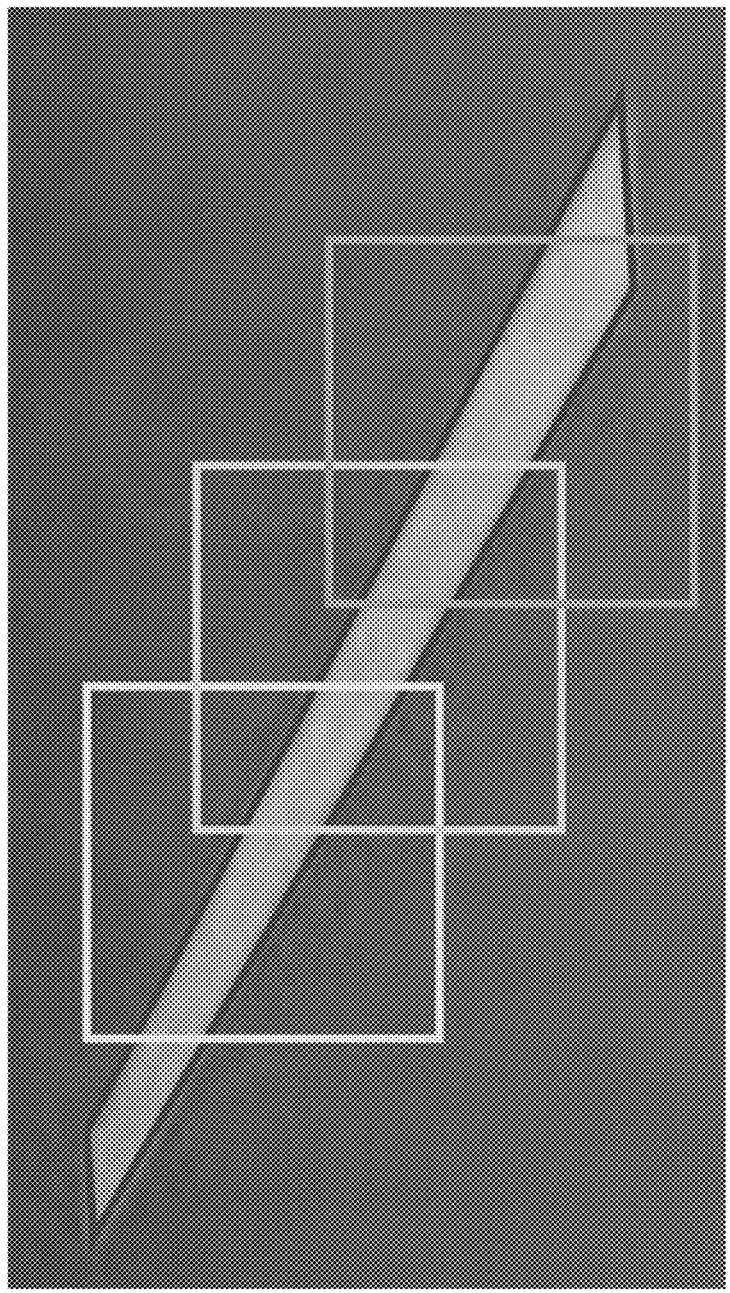
FIG. 3 is an example of lane marking labeling and segmented lane marking blocks.

According to the technical solution in the present disclosure, parameters of the input module, the spatial attention module, the feature extraction module, and the detection module of the deep convolutional neural network in step (3) are determined by learning, including:

Sub-step A, preparing images for training: as shown in FIG. 3, lane regions are manually labeled in the images, and a labeled lane can be segmented into several image blocks along the extension direction of the lane, and each image block contains a lane marking in the center and overlaps some background regions in both left and right sides.

Sub-step B, preparing expected output for training images: each training image corresponds to an expected feature map. If the height and the width of a given training image are M and N, respectively, the expected output corresponding to the image is an M'×N'×C' feature map, where $$M' = \left\lceil \frac{M}{8} \right\rceil, N' = \left\lceil \frac{N}{8} \right\rceil,$$

and C'=$5n_B$, respectively, $\lceil a \rceil$ represents an integer no greater than a, $n_B$ denotes a preset number of detection boxes for each anchor point. All values of the expected feature map are set according to the coverage of labeled marking regions.

Sub-step C, training: input a training image to the deep convolutional neural network to generate the corresponding output feature map by the detection module, and calculating a loss function according to the output feature map and the expected feature map of the training image; load training images in batches to minimize the sum of loss functions of all training samples, and update network parameters by the stochastic gradient descent optimization algorithm.

According to the technical solution in the present disclosure, in step (6), Stage 2, Stage 3, and Stage 4 convolutional layer groups of ResNet50 network are served as the feature extraction module, the Stage 2 includes 3 residual blocks, denoted as ResBlock2_i, the Stage 3 includes 4 residual blocks, denoted as ResBlock3_i, and the Stage 4 includes 6 residual blocks, denoted as ResBlock4_i, where i=1, 2, . . . , $n_R$, and $n_R$ denotes the number of residual blocks in the Stage. The first residual blocks in Stage 2, Stage 3, and Stage 4 are ResBlock2_1, ResBlock3_1, and ResBlock4_1, respectively. Their structures include two branches. The main branch includes 3 convolutional layers, where the first convolutional layer has C 1×1 kernels, the second has C 3×3 kernels, and the third has 4C 1×1 kernels. Each convolutional layer is followed by a batch normalization and a ReLU operation. The 3 convolutional layers of ResBlock2_1 all have a stride of 1, while in ResBlock3_1 or ResBlock4_1, the first convolutional layer has a stride of 2 and the others have a stride of 1. The other branches of ResBlock2_1, ResBlock3_1, and ResBlock4_1 are shortcut branches, each of which includes a convolutional layer, followed by a batch normalization operation. The convolutional layer of the shortcut branch of ResBlock2_1 has 4C 1×1 kernels with a stride of 1. The convolutional layers of the shortcut branches of ResBlock3_1 and ResBlock4_1 have 4C 1×1 kernels with a stride of 2. Outputs of the last convolutional layer of the main branch and the shortcut branch are fused via element-wise sum to serve as the output of the residual block. In Stage 2, Stage 3, and Stage 4 of ResNet50 network, any residual block except ResBlock2_1, ResBlock3_1, and ResBlock4_1 has a structure consists of two branches. The main branch has 3 convolutional layers. The first convolutional layer has C 1×1 kernels, the second has C 3×3 kernels, and the third has 4C 1×1 kernels. Each convolutional layer is followed by a batch normalization and a ReLU operation, and all these convolutional layers have a stride of 1. The other branch directly copies the feature map input to the residual block, and sums corresponding elements one by one with the output of the last convolutional layer of the main branch to serve as the output of the residual block.

Figure 4:
FIG. 4 shows examples of results of lane detection using the method according to an embodiment of the present disclosure.

FIG. 4 shows results obtained by the lane detection method according to the embodiment of the present disclosure in multiple imaging scenarios including backlighting, rainy and foggy days, and night. In the figure, the first column shows input images, and the second shows lane marking blocks detected by the deep convolutional neural network as rectangular boxes. Detected lanes are shown as straight lines.

The above are only preferred embodiments of the present disclosure, but the scope of protection of the present disclosure is not limited thereto. Any modification or replacement made within the spirit and principle of the present disclosure shall fall within the scope of protection of the present disclosure.

What is claimed is:

1. A lane detection method integratedly using image enhancement and a deep convolutional neural network, wherein the method comprises:

Step (1) acquiring a color image I containing lanes, comprising three component images $I^{(0)}$, $I^{(1)}$, and $I^{(2)}$ corresponding to red, green, and blue color components, respectively, performing CLAHE (contrast limited adaptive histogram equalization) algorithm K times on the image I to enhance contrast of the image/ and generate K enhanced images, where a kth enhanced image, k=0, 1, . . . , K−1, is formed by using a cth channel image/(c) as the input, and c is the remainder of k divided by 3;

Step (2) constructing the deep convolutional neural network, which comprises an input module, a spatial attention module, a feature extraction module, and a detection module for lane detection, and stacking the three component images of the color image/in step (1) and the K enhanced images generated by contrast enhancement on the three component images with the CLAHE algorithm in step (1) as a tensor comprising K+3 channels to serve as an input to the deep convolutional neural network;

Step (3) Passing the input through a convolutional layer with 64 kernels of size 7×7 and with a stride of 2, and then performing a batch normalization and a ReLU activation operation, and following a max pooling layer with a 3×3 sampling kernel and with a stride of 2 as a final part of the input module; and feeding an output of the input module, which is an $M_1 \times N_1 \times C$ feature map, to the spatial attention module, where $M_1$, $N_1$ and C denote a height, a width and a number of channels of the feature map, respectively;

Step (4) performing, by the spatial attention module, two pooling operations on the feature map that input to the module; concatenating two $M_1 \times N_1 \times 1$ feature maps formed by the two pooling operations into an $M_1 \times N_1 \times 2$ feature map, then feeding the concatenated feature map to a convolutional layer with a 7×7 kernel and with a stride of 1, and finally, calculating a spatial attention map of size $M_1 \times N_1 \times 1$ using a Sigmoid function; wherein one pooling operation is an average pooling and the other one is a max pooling, and wherein in the two pooling operations, a sampling kernel is of size 1×1×C and of stride 1;

Step (5) taking elements in the spatial attention map as weights, multiplying values of all positions of each channel of the output feature map of the input module by weights of corresponding positions of the spatial attention map to form a feature map, and feeding the formed feature map into the feature extraction module;

Step (6) taking Stage 2, Stage 3, and Stage 4 convolutional layer groups of ResNet50 as the feature extraction module, wherein an output of the Stage 3 serves as an input to the Stage 4 as well as an input to a convolutional layer comprising 5 $n_B$ kernels of size 1×1 and with a stride of 1, where ng denotes a preset number of detection boxes for each anchor point, and $F_1$ denotes a feature map outputted by the convolutional layer; wherein an output of the Stage 4 passes through a convolutional layer comprising $5n_B$ kernels of size 1×1 and with a stride of 1, and the generated feature map is up-sampled and then sums corresponding elements one by one with $F_1$ to generate an $M_2 \times N_2 \times 5 n_B$ feature map F, a height and width dimensions of the feature map F are $M_2$ and $N_2$, respectively, and a number of channels is $5n_B$;

Step (7) each point on an $M_2 \times N_2$ plane in the feature map obtained in step (6) corresponding to an anchor point, determining, by the detection module according to values of an anchor point (m, n) on all channels, whether a lane marking block exists at the anchor point, and a size and a shape of the lane marking block, wherein i is specifically set to an integer, $1 \leq i \leq n_B$, and a value of an ith channel represents a probability that the lane marking block is detected at the anchor point by using an ith preset detection box; from a $(n_B+1)$th to a $5n_B$th channels, each four channels corresponding to a set of position parameters of a detected lane marking block, wherein values of channels $n_B+4$ (i−1)+1 and $n_B+4$ (i−1)+2 represent offset values in the width direction and the height direction between a center of the ith preset detection box and a center of an actual detection box, respectively, a value of a channel $n_B+4$ (i−1)+3 represents a ratio of a width of the preset detection box to a width of the actual detection box, and a value of a channel $n_B+4i$ represents a ratio of a height of the preset detection box to a height of the actual detection box; and Step (8) determining lane models by the Hough transform algorithm using center coordinates of marking blocks detected by the deep convolutional neural network.

2. The lane detection method integratedly using image enhancement and a deep convolutional neural network of claim 1, wherein said performing a CLAHE (contrast limited adaptive histogram equalization) algorithm to enhance contrast of the image in step (1) comprises:

first, processing image $I^{(c)}$ by using a sliding window, where a height and a width of the sliding window are $M_b+k\Delta$ and $N_b+k\Delta$, respectively, $M_b$, $N_b$, and $\Delta$ are preset constants that are set according to a size of the image and an expected number of the sliding windows;

second, calculating a histogram of a block image covered by the sliding window as H, clipping a histogram bin $H_i$ as $H_i=h$ when $H_i$ exceeds a specified limit h and accumulating amplitude differences, distributing the accumulated differences uniformly to all bins of H to form a modified histogram;

next, taking the modified histogram as input and calculating a mapping function for each gray level by the histogram equalization algorithm; and further, setting sliding steps in height and width directions to half of the height and the width of the sliding window, and taking a mean value of the mapping functions calculated by all windows covering a pixel in $I^{(c)}$ as a value of the pixel in the enhanced image.

3. The lane detection method integratedly using image enhancement and a deep convolutional neural network of claim 1 further comprising:

determining, by learning, parameters of the input module, the spatial attention module, the feature extraction module, and the detection module of the deep convolutional neural network in step (2), wherein the method comprises:

sub-step A, preparing images for training: manually labeling lane markings in the images, and segmenting a labeled lane into image blocks, wherein each image block contains a lane marking in the center and overlaps background regions in both left and right sides;

sub-step B, preparing expected output for training images: each training image corresponding to an expected feature map, wherein when a height and a width of the training image are M and N, respectively, the expected output corresponding to the image is an M'×N'×C' feature map, where $$M' = \left\lceil \frac{M}{8} \right\rceil, N' = \left\lceil \frac{N}{8} \right\rceil,$$

and C'=5 $n_B$, respectively, and $\lceil a \rceil$ represents an integer no greater than a, ng denotes a preset number of detection boxes for each anchor point, and all values of the expected feature map are set according to coverage of labeled marking regions; and sub-step C, training: inputting a training image to the deep convolutional neural network to generate a corresponding output feature map by the detection module, calculating a loss function according to the output feature map of the detection module and an expected feature map corresponding a training image, loading training images in batches to minimize a sum of loss functions of all training samples, and updating network parameters by a stochastic gradient descent optimization algorithm.

\* \* \* \* \*